United States Patent [19]
Tilley et al.

[11] Patent Number: 5,488,091
[45] Date of Patent: Jan. 30, 1996

[54] HIGH MOLECULAR WEIGHT POLYSTANNANES BY METAL-CATALYZED DEHYDROPOLYMERIZATION

[75] Inventors: T. Don Tilley, Rancho Penasquitos, Calif.; Toru Imori, Saitama, Japan

[73] Assignee: The Regents of the University of California, Oakland, Calif.

[21] Appl. No.: 265,447

[22] Filed: Jun. 24, 1994

[51] Int. Cl.[6] .................................................. C08G 79/00
[52] U.S. Cl. .................................. 528/9; 528/395; 556/11; 556/12; 556/28; 556/82
[58] Field of Search .......................... 556/11, 12, 28, 556/82; 528/9, 395

[56] References Cited

U.S. PATENT DOCUMENTS

| | | | |
|---|---|---|---|
| 3,674,822 | 7/1972 | Stemniski | 260/429.7 |
| 3,699,138 | 10/1972 | Debreczeni et al. | 260/429.7 |
| 3,726,906 | 4/1973 | Reifenberg et al. | 260/429.7 |
| 5,198,401 | 3/1993 | Turner et al. | 502/155 |
| 5,241,025 | 8/1993 | Hlatky et al. | 526/129 |

OTHER PUBLICATIONS

Zou, et al. Polym. Prepr. (Am. Chem. Soc. Div. Polym. Chem.), 33:188 (1992).

Adams, et al., "Polystannanes: A Route to Molecular Metals?," Angew. Chem. Int. Ed., 26: 1255 (1987).

Sita, L. R. "A New Strategy for the Synthesis of Homologously Pure Linear Polystannane . . . " Organomet. 11:1442 (1992).

*Primary Examiner*—Melvyn I. Marquis
*Attorney, Agent, or Firm*—Brown Martin Haller & McClain

[57] ABSTRACT

A method for coupling tin-containing molecules via a Sn—Sn bond is described. The invention employs dehydrocondensation to link the Sn atoms of two molecules to form tin dimers as well as novel high molecular weight organotin polymers. In a preferred embodiment, catenated tin polymers are formed from hydrostannane precursors in the presence of a suitable metal catalyst. A particularly preferred method involves coupling dialkylstannane monomers in the presence of a metallocene catalyst to form polystannanes. Preferred catalysts include electropositive metals, such as Zr and Hf. The polystannanes are photolabile, decomposing readily under room light conditions.

33 Claims, 4 Drawing Sheets

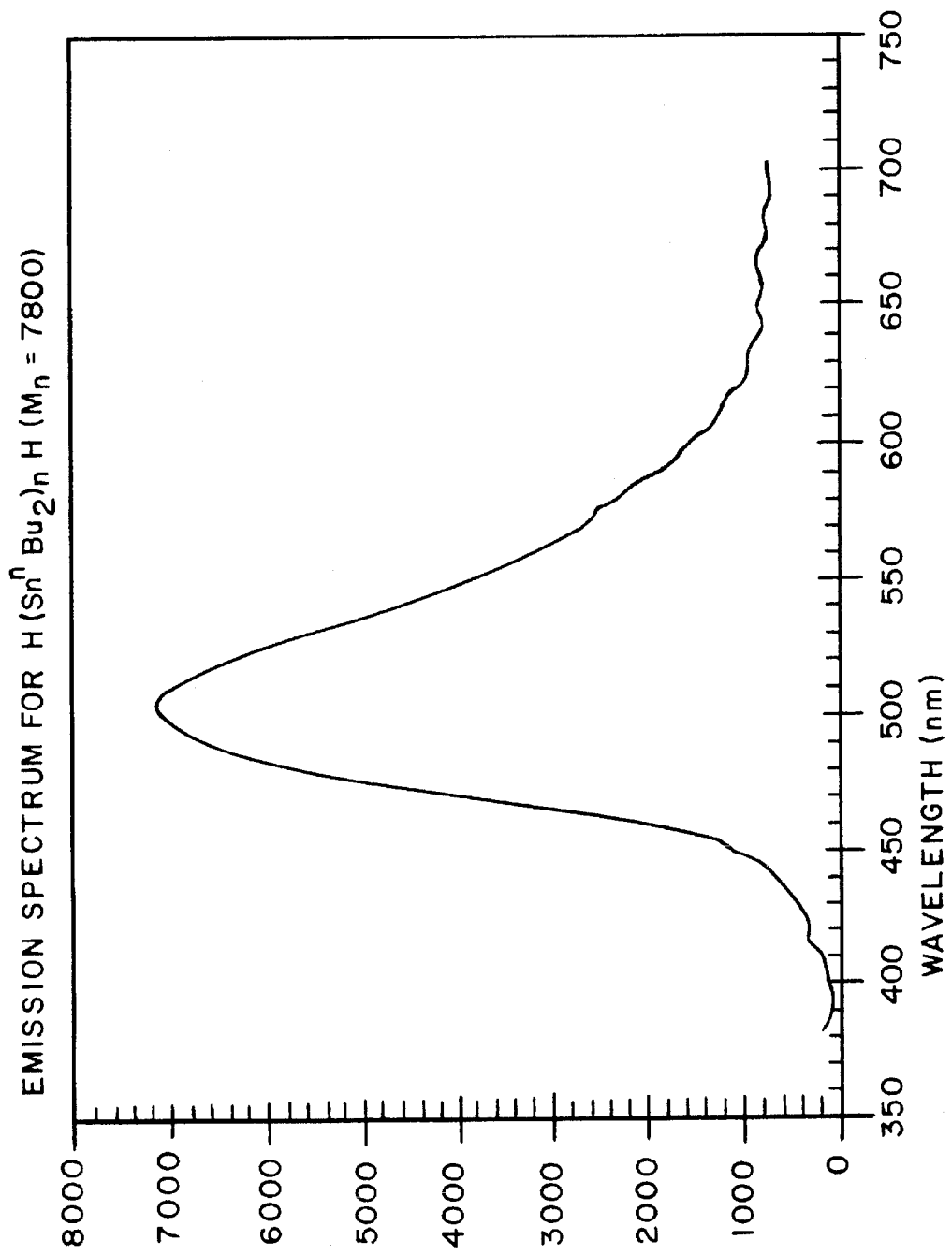

HIGH MOLECULAR WEIGHT POLYSTANNANES BY METAL-CATALYZED DEHYDROPOLYMERIZATION

STATEMENT OF GOVERNMENT SUPPORT

This invention was made with Government support under Grant No. CHE 9212283 awarded by the National Science Foundation. The Government has certain rights in this invention.

TECHNICAL FIELD

The present invention relates to methods for forming compounds containing tin-tin bond, as in catenated tin compounds.

REFERENCES CITED

U.S. Patent Documents

U.S. Pat. No. 3,674,822 issued to Stemniski;
U.S. Pat. No. 3,699,138 issued to Debreczeni et al.;
U.S. Pat. No. 3,726,906 issued to Reifenberg et al.;
U.S. Pat. No. 5,241,025 issued to Hlatky et al.;
U.S. Pat. No. 5,198,401 issued to Turner et al.

Other Publications

Adams et al., *Angew. Chem. Intl. ED.*, 26:1255 (1987);
Creemers et al., *J. Organomet. Chem.*, 7:237 (1967);
Funsten et al., *J. Appl. Phys.*, 71:1475 (1992);
Jousseaume et al., *J. Organomet. Chem.*, 294:C41 (1985);
Miller et al., *Chem. Rev.*, 89:1359 (1989);
Sita, *Organometallics*, 11:1442 (1992);
Tilley, *Acc. Chem. Res.*, 26:22 (1993);
Trefonas et al., *Polym. Sci. Polym. Chem. Ed.*, 23:2099 (1985);
Woo et al., *JACS*, 114:7047 (1992);
Zou et al., *Polym. Prepr. (Am. Chem. Soc. Div. Polym. Chem)*, 33:188 (1992).

BACKGROUND OF THE INVENTION

Interest in the polymers of Group 14 elements has historically been concerned primarily with those containing carbon. The carbon-based polymers have demonstrated a remarkable chemical versatility and have found a splendid variety of applications. Although promising in their own respects, polymers based on the heavier Group 14 elements (silicon, germanium, tin, and lead) have been less studied.

The commercial potential for polymers based on the heavier Group 14 elements is illustrated by that for some recently developed polysilane high polymers (Miller et al.). For instance, soluble, castable polysilane homo- and copolymers have been developed. Also, the low-temperature pyrolysis (Yajima process) of polydimethylsilane leads to the formation of a soluble carbosilane which can be processed into forms, films, or fibers. The soluble carbosilanes can be further processed and fired to produce β-SiC fibers, which are otherwise not available.

An important respect in which heavy Group 14 polymers differ from carbon-based polymers is in their photolability and sensitivity to ionizing radiation. These properties are reflected in facile chain scission and crosslinking upon exposure to sunlight. For instance, heavy group 14 polymers have been employed as broad spectrum photoinitiators of vinyl polymerizations. They often have excellent photoconductive properties and by adjusting doping levels both conductive and semiconductive films have been made.

Perhaps the most extensively explored application of heavy Group 14 polymers, e.g., polysilanes, is as photoresists in microlithography. The polysilane polymers are soluble in organic solvents and can be coated as high quality optical films onto a semiconductor substrate. They are thermally and oxidatively stable but photolabile over a broad spectral range and their resistance to oxygen plasma conditions makes them well-suited to multilayer lithographic applications, where highly anisotropic etch profiles are desired. They also are attractive as contrast enhancing agents in microlithography, photoresists in e-beam lithography, ablative targets in dry development schemes, and as materials for nonlinear optical purposes.

Thin films containing tin can also be used as conductors or coatings for semiconductors, typically in the form of elemental metal or metal oxides. Such tin-containing films can be formed by ion or electron beam induced deposition using tin tetrachloride or tetramethyltin (Funsten et al.). Films produced by these methods generally retain an undesirable amount of carbon, hydrogen, and/or halogen from the precursor molecules as high conductivities are found to require significant loss of these impurities. To the extent compounds having a high tin content can be exploited in various applications involving their decomposition, such compounds may parallel the polysilanes or even be superior to previously used materials.

Among the approaches taken to forming compounds having a high tin content are those that generate a tin-tin bond in the compound. [See, e.g., *Organotin Chemistry*, Elsevier, I. Omae, ed., New York, N.Y. (1989)]. Such approaches include those involving pyrolysis, as well as Grignard and Wurtz coupling schemes. For instance, Reifenberg et al. (U.S. Pat. No. 3,726,906) describe pyrolysis of tin formate compounds to form hexaalkyltin compounds. Another method of forming ditin compounds through the intermediacy of a tin formate species has also been described (Jousseaume et al.). Stemniski (U.S. Pat. No. 3,674,822) describes reacting appropriate Grignard reagents and tin dihalides to give cyclic bis(aryloxyaryl)tin compounds. Debreczeni et al. (U.S. Pat. No. 3,699,138) describe the synthesis of distannanes by the reaction of a triorganotin halide and molten sodium. Relatively short chain stannane oligomers have been reported formed by coupling various diiodo tin compounds with $Ph_3SnLi$ (Adams et al.). Recently, a Wurtz-type coupling approach has been described for which relatively long chain polystannanes are reported (Zou et al.). Also, a synthesis of linear oligostannanes has been proposed in which a tin atom is added to a growing chain by a two-step process requiring regeneration of a terminal Sn—H group (Sita).

Commercially, organostannanes are usually formed via Wurtz or Grignard coupling reactions, even though the reagents used in these reactions are frequently pyrophoric and difficult to handle. At present, Wurtz or Grignard schemes would appear to be the methods of choice commercially in the formation of ditin species. Among the difficulties associated with synthesizing compounds having tin-tin bonds is that the bonds are easily cleaved by oxygen, halogen or acid, as well as light, as mentioned above. On the other hand, these properties of high and versatile reactivity make catenated tin compounds particularly attractive as candidates for the deposition of thin tin films.

New synthetic procedures for coupling tin species are desired, whereby compounds containing multiple Sn—Sn bonds can be formed safely and conveniently. Further desired is a method for forming catenated tin polymers, polystannanes, from relatively simple and inexpensive precursor molecules. Long-chain tin compounds formed by such a method are expected to exhibit highly advantageous photolability properties.

SUMMARY OF THE INVENTION

The present invention is fundamentally a novel method for forming tin compounds having at least one tin-tin bond. A present inventive method minimally involves coupling two tin-containing molecules by dehydrocondensation, whereby a tin-tin bond is formed between the two molecules with the elimination of hydrogen gas. By repeating the dehydrocondensation process on one or more substrate molecules having multiple functional groups, high molecular weight, long-chain catenated tin compounds can be formed. For example, an instant method can be applied to a single bifunctional substrate (monomer) to form a linear organotin polymer, e.g., a linear polystannane. Many novel and inventive polymeric and oligomeric tin compounds can be formed by a method of the invention.

In a broad aspect of the invention, a method is contemplated for making a tin compound having at least one tin-tin bond which comprises combining first and second tin-containing precursor molecules with a suitable coupling agent. The combined reagents are then subjected to reaction conditions effective to form a tin-tin bond between the two tin-containing molecules and eliminate hydrogen gas. When both precursor molecules contain a single coupling site, e.g., a single Sn—H linkage, a dimeric tin compound is typically formed. However, when at least one of the tin-containing precursor compounds contains one or more additional coupling sites, linear and/or higher dimensional polymers can be formed. Preferred first and second tin-containing precursors are selected from mono-, di-, and tri-organo-substituted hydrostannanes. Particularly preferred substituents include alkyl, aryl, alkaryl, aralkyl, silyl, siloxy, amido, alkoxy, amidosilyl, stannyl, and stannoxy groups, and mixtures thereof.

In a preferred aspect of the invention, a tin compound having at least one tin-tin bond is formed by reacting first and second hydrostannane molecules in the presence of a suitable coupling agent. The reaction is performed under conditions effective to link a tin atom of the first hydrostannane molecule to a tin atom of the second hydrostannane molecule. Thus, identical or differing hydrostannane molecules, including oligo- and polystannanes, can be coupled to form higher molecular mass, and typically longer chain, organotin molecules. Particularly preferred hydrostannane molecules are dialkyl-, diaryl-, and mixed alkyl-, arylhydrostannanes. Branched compounds, including branched tin polymers, are also contemplated within the invention, however, such as when a hydrostannane having three reactive sites, e.g., Sn—H groups, is employed.

A particularly preferred aspect of the invention is a process for polymerizing a plurality of hydrostannane molecules, thereby forming at least one polymeric stannane compound (polystannane). Such a polymerization process comprises introducing a suitable polymerization agent to the hydrostannane molecules, and maintaining the combined reagents (admixture) under reaction conditions effective to form at least one polymeric stannane. The hydrostannane molecules used in such polymerization can be monomers, which contain a single tin atom, or oligomers, which contain multiple tin atoms linked together, such as by Sn—Sn bonds. An especially preferred polymerization process involves two steps, whereby tin oligomers are formed from monomers in a first step, and the resulting oligomers are coupled in the second step to form the polymeric stannane. Identical or different catalysts can be used in each step.

A polystannane formed by a polymerization process of the invention typically has a degree of polymerization greater than about 10, and frequently greater than about 70. Although the maximal degree of polymerization that can be obtained is theoretically indefinite, it is frequently less than about 1000, more usually less than about 10,000, and almost always less than about 1,000,000. Because polymer chain propagation in an instant process appears to occur more or less randomly, a distribution of polystannanes having different molecular masses is typically obtained. Such a polystannane composition comprising a plurality of nonidentical polystannanes can be characterized with respect to its average molecular weight (Mw) and its number average molecular weight (Mn), as determined from polystyrene reference standards.

An instant method can also be used to form cyclic compounds. For instance, cyclic oligostannanes can be formed from dihydrostannane monomers by a dehydrocondensation method of the invention. Formation of such cyclic species is typically optimal under dilute monomer concentrations.

Preferred tin coupling and/or polymerization agents for use with a method of the invention contain electropositive (Lewis acidic) metals. Such preferred agents typically contain a transition metal, especially an early transition metal such as Sc, Y, Ti, Zr, and Hf. Alternatively, a preferred coupling agent can contain a Group 2 metal such as Mg, Ca, Sr, and Ba; a Group 13 metal such as Al and Ga; an actinide or a lanthanide metal. Especially preferred coupling and/or polymerization agents are provided as metallocene derivatives of an above-listed metal. Most preferred coupling agents are metallocene derivatives of zirconium or hafnium.

New compositions of matter are afforded by the present invention. Among the new compositions of matter are stannane homopolymers, which can be represented by the formula X—$(R^1R^2Sn)_n$—Y. In the formula, "n" represents the approximate degree of polymerization and is greater than about 10, and frequently greater than about 70. Substituents X, Y, $R^1$, and $R^2$ are each hydrogen or a monovalent hydrocarbyl radical. Such a polystannane can be present in its purified (isolated) form or as a component of a composition containing other nonidentical oligo- or polystannanes, including cyclic species.

When one of the substituents referred to above is a monovalent radical, it preferably is selected from the group consisting of alkyl, aryl, alkaryl, aralkyl, silyl, siloxy, amido, alkoxy, amidosilyl, stannyl, and stannoxy radicals, and mixtures (i.e., chimeric substituents) thereof. Preferred radicals are $C_1$–$C_{12}$ radicals, which include methyl to dodecyl alkyl radicals, cyclohexyl radicals and aromatic radicals such as phenyl and benzyl. Preferably, X and Y in the above-described formula are H.

An exemplary composition containing an above-described polymer is formed by the metal-catalyzed dehydropolymerization of di-n-butylstannane. Linear homopolymeric stannane molecules are thereby formed which have the formula X—$(^nBu_2Sn)_n$—Y. Preferably, the number average molecular mass (Mn) of such a composition is greater than about 2 kilodaltons, as when cyclic species are included. More preferably, Mn is greater than about 15 kilodaltons, including when cyclic components are absent or disregarded.

In a further aspect of the invention, a method for decomposing polystannane molecules of the invention, such as on a substrate, is contemplated. A preferred method comprises contacting a substrate with the polystannane and exposing the polystannane to a radiation source. The radiation source and exposure conditions are effective to decompose the polystannane into smaller molecules, oligostannanes. In certain applications it is preferred that the smaller molecules are sufficiently volatile that they can be removed under an applied vacuum.

The present invention affords significant advantages over previously available methods for coupling tin species. For example, the present method provides a convenient one-step synthesis of high molecular weight catenated tin compounds. The monomers that can be used in such a synthesis are relatively simple and inexpensive. Moreover, the coupling and/or polymerization agents employed are relatively safe to handle when compared with previously explored Grignard or Wurtz-type systems. Also, the evolution of dihydrogen gas during the instant reactions facilitates polymer purification. Because a coordination polymerization scheme is employed, the method further offers the potential for controlling the stereo- and regio-selectivity of high molecular weight tin polymers by altering the structure of the polymerization catalyst.

A fuller understanding of the present invention can be obtained by a study of the following detailed description, examples, and appended claims.

BRIEF DESCRIPTION OF THE DRAWINGS

FIG. 41 depicts the emission spectrum of a $H(Sn^nBu_2)_nH$ sample (Mw/M$_n$=17,600/7800) under excitation by a $N_2$ laser ($\lambda$=337.1 nm), as described in Example 11.

DETAILED DESCRIPTION OF THE INVENTION

Figure 1A:
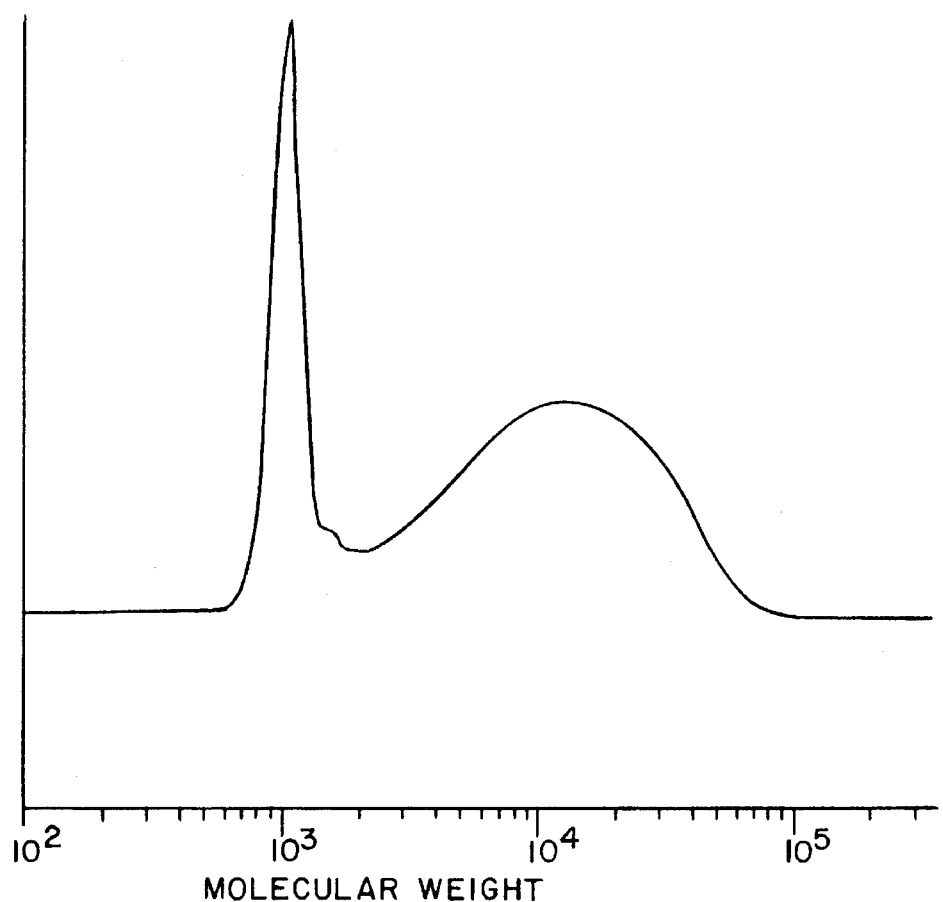
FIG. 1A depicts a gel permeation chromatogram (GPC) of the polymerization products of $^nBu_2SnH_2$, formed as described in Example 1, for which a sharp peak at about 1000 amu is attributed to cyclic stannane species and a broader fraction at higher molecular mass is attributed to linear polystannane chains. The catalyst used in this study was $(C_5H_5)(C_5Me_5)Zr[Si(SiMe_3)_3]Me$.

The present invention is a novel method for coupling two tin-containing precursor molecules via a tin-tin bond. The method comprises combining the tin-containing precursors with a suitable coupling agent, which is discussed more fully hereinafter, and subjecting the combined reagents to reaction conditions that are effective to form a tin compound having a tin-tin bond concomitant with the elimination of dihydrogen. The overall chemical transformation, whereby two molecules are joined and dihydrogen is eliminated, is referred to herein as "dehydrocondensation" or "dehydropolymerization".

One of the simplest aspects of an instant method is depicted by the following overall reaction:

$$R^1R^2R^3Sn-H+H-SnR^4R^5R^6 \rightarrow R^1R^2R^3Sn-SnR^4R^5R^6+H_2 \qquad (1)$$

In equation (1) above, two tin-containing compounds, such as two stannanes, are joined via a Sn—Sn bond to produce a tin dimer along with the elimination of $H_2$ (coupling agent not shown). The substituents $R^1$–$R^6$ can each be hydrogen or a monovalent hydrocarbyl radical, as described more fully hereinafter. Especially when one or more of the aforementioned substituents is a hydrogen atom, cyclic, catenated, or cross-linked tin compounds can be formed. Whenever the reactants in the above equation are identical, i.e., a tin-containing molecule reacts with its identical counterpart, a symmetric dimer can be formed. Even when different reactants are employed, some symmetric dimer is expected to be formed due to the possibility of each reactant reacting with an identical species. It should be appreciated, however, that even when identical species react to form a coupled product, some ligand redistribution and/or rearrangement can occur, without departing from the thrust of the present invention.

In a preferred aspect of the invention, at least one of an above-described tin-containing precursor itself contains at least one tin-tin bond. A tin compound having more than one tin-tin bond, such as a tin oligomer or polymer, i.e., a compound having multiple tin-tin bonds, is thereby formed by the reaction. Accordingly, in equation (1) above, at least one of the substituents $R^1$–$R^6$ is a stannyl group in this event. A tin compound formed by such a reaction can have a branched network of tin atoms, or preferably has a substantially linear chain of tin atoms.

Among the compounds suitable for use as a tin-containing precursor of the present method are mono-, di-, and tri-organo-substituted hydrostannanes. These organo-substituted stannane compounds can be represented by the formulas $R^1SnH_3$, $R^1R^2SnH_2$, and $R^1R^2R^3SnH$, respectively, where each "R" substituent represents a group containing at least one organic moiety and include alkyl, aryl, alkaryl (alkyl-substituted aryl group), aralkyl (aryl-substituted alkyl group), silyl, siloxy, amido, alkoxy, amidosilyl, stannyl, and stannoxy groups, as well as mixtures thereof, i.e., chimeric substituents composed of more than one of the above-listed groups. As used herein, "stannane" refers to a tin compound having at least one Sn—H or Sn—R linkage, and "hydrostannane" refers to a tin compound having at least one Sn—H linkage.

More preferably, a substituent of a stannane precursor molecule is an alkyl, aryl, alkaryl, or aralkyl group. Yet more preferably, a stannane precursor molecule is a dialkyl-, diaryl-, or mixed alkyl, aryl-hydrostannane. Such a hydrostannane can be readily polymerized, as described herein, to form polydialkylstannanes, polydiarylstannanes, and polyalkylarylstannanes, respectively. Exemplary polymers include poly(di-n-butyl)stannanes, poly(di-n-octyl)stannanes, poly(diphenyl)stannanes, and poly(methylphenyl)stannanes.

It is generally preferred that a tin-containing precursor molecule, which is to be linked with another such molecule, not have a halogen atom directly bonded to the tin atom that is to form a tin-tin bond, probably because undesired side reactions occur. In certain cases, however, a tin-containing precursor having a Sn—X linkage (where X is halogen) is contemplated to couple to another tin-containing compound by dehydrocondensation, as in equation (1) above.

In a preferred aspect of the invention, a method of forming a tin compound having at least one tin-tin bond is contemplated in which an above-described precursor molecule is a hydrostannane. Such a method comprises reacting first and second hydrostannane molecules in the presence of a suitable coupling agent, which is described more fully hereinafter. The reaction is conducted under conditions effective to link a tin atom of the first hydrostannane to a tin atom of the second hydrostannane. While not well-studied, the Sn—Sn linkage referred to is likely best characterized as being covalent; however, particularly for long chain tin polymers the linkage can have metallic or semiconductive properties. Moreover, the electronic structure of an instant tin polymer can be expected to have some similarity with the bonding properties of polysilane high polymers, e.g., σ-conjugation (Miller, et al.).

By performing an above-described dehydrocondensation reaction on a plurality of tin-containing precursors, such as hydrostannanes, a catenated tin oligomer or polymer, such as a polystannane, can be formed. Such oligomeric or polymeric tin compound can be formed from monomeric or oligomeric precursor molecules.

A reaction in which nonidentical precursor molecules are coupled and the precursor molecules each contain multiple tin-tin bonds, e.g., oligomers, is depicted by the following equation, whereby a tin block copolymer is formed (coupling agent not shown):

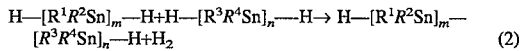

$$\text{H}—[R^1R^2\text{Sn}]_m—\text{H}+\text{H}—[R^3R^4\text{Sn}]_n—\text{H} \rightarrow \text{H}—[R^1R^2\text{Sn}]_m—[R^3R^4\text{Sn}]_n—\text{H}+\text{H}_2 \quad (2)$$

For simplicity, equation (2) depicts coupling just two oligostannanes to form a larger composite molecule having two "blocks". However, it should be apparent that in practice this reaction would likely produce polymers having a higher degree of coupling than that shown. Whenever $R^1$—$R^4$ in the equation are identical, a homopolymer is formed regardless of the lengths of the respective oligomers. Whenever the substituents $R^1$—$R^4$ are not identical on different molecules, it should be apparent that block heteropolymers can be formed, as well as some amount of homopolymers. Substituents $R^1$—$R^4$ are preferably H or a monovalent hydrocarbyl radical, as described hereinabove, and "n" and "m" represent the number of repeat units.

Whenever a tin-containing precursor molecule possesses more than one coupling functionality, such as a Sn—H linkage, an instant method can be used to couple (polymerize) many such molecules in a multi-step (continuous) process. Hence, a plurality of tin-containing monomers is polymerized to form a tin homopolymer.

Typically, an instant method is applied to a single bifunctional substrate, such as a dihydrostannane, to form a linear organotin polymer, e.g., a linear polystannane. Many novel and inventive polymeric and oligomeric organotin compounds, and mixtures of such compounds, can be formed by this method. An exemplary reaction whereby a plurality of dihydrocarbyl-hydrostannanes are coupled to form a tin homopolymer is depicted in equation (3) (catalyst not shown):

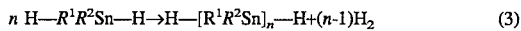

$$n \text{ H}—R^1R^2\text{Sn}—\text{H} \rightarrow \text{H}—[R^1R^2\text{Sn}]_n—\text{H}+(n-1)\text{H}_2 \quad (3)$$

A polymerization process of the invention comprises forming an admixture of tin-containing precursors (monomers), such as hydrostannanes, and a suitable polymerization agent, described more fully hereinafter. The admixture is then maintained under reaction conditions effective to form a tin polymer, e.g., a polystannane. In general, the order of introduction of reactants is inconsequential, at least in part because the reactants have become intimately mixed by the time an induction phase of the reaction has taken place.

In a particularly preferred polymerization process, a plurality of hydrostannane monomers is polymerized. The method comprises introducing a suitable polymerization agent to the plurality of hydrostannanes to form an admixture thereof. The admixture is maintained under conditions effective to form at least one polymeric stannane compound, i.e., a polystannane. Typically, a plurality of polystannanes having more than one molecular formula, i.e., nonidentical products, are formed by this process, with the polystannanes distinguished primarily by chain length and molecular mass.

In another particularly preferred aspect of the invention, a two-step approach to forming a catenated tin polymer is employed. In a first step, monomeric tin-containing molecules, such as dialkyl-hydrostannanes, are oligomerized and/or polymerized, according to equation (3) above, in the presence of a first polymerization agent. The oligomers, which are generally provided as a plurality of nonidentical oligomers, are then coupled via a second step in the presence of a second polymerization agent, as in equation (2) above, to form at least one larger molecule, e.g., a catenated tin polymer. Generally, multiple nonidentical oligomers are coupled to form a plurality of tin polymers, such as polystannanes. Clearly, block copolymers of organotin oligomers can also be prepared by an instant method by coupling oligomers having different organic substituents in the second step. The same or different coupling (polymerization) agents can be used to perform the aforesaid first and second steps.

A method of the invention can also include isolating a tin polymer, e.g., a polystannane, from any unreacted reagents, such as monomers, polymerization agent, reaction byproducts, and other undesired impurities following the polymerization reaction.

A polystannane formed by an above-described process is usually substantially linear, although some degree of branching is anticipated, particularly when the reacting monomer is trifunctional, e.g., has the formula $R^1\text{SnH}_3$, where $R^1$ is a substituent as described hereinabove. Of course, a tin polymer generated, as in equation (3), from monomers having the formula $R^1R^2\text{SnH}_2$, where either or both $R^1$ and $R^2$ are stannyl groups, would also be regarded as branched and is contemplated by the present invention. Preferably, $R^1$ and $R^2$ are hydrocarbyl substituents as described hereinabove.

Whenever an aforedescribed polymerization process is employed to form a polymeric tin compound, cyclic organotin species as well as linear tin polymers are typically formed. The degree of polymerization of the polymers, i.e., the number of linked monomers in the polymer, is typically greater than about 5, more typically greater than about 10, and frequently greater than about 70. In principle, an infinite number of sequential couplings of stannane monomers to a growing polymer chain can take place using an instant method. However, chain length is affected by such parameters as catalyst type, reaction time, amount of monomer, and competing side reactions. As a practical matter, the degree of polymerization in a polystannane formed by an above method is confidently less than 1,000,000, usually less than about 100,000, and is frequently less than about 10,000 to 20,000. For certain monomeric species, the degree of polymerization commonly attained is less than about 1000.

AS used herein, the terms "effective conditions," "conditions effective to," and the like, refer generally to the reaction conditions that effect any of the chemical transformations illustrated above by equations (1)–(3), their variants as described hereinabove, and obvious analogs. Hence, conditions of temperature, mole ratio, solvent, illumination, inert atmosphere, and the like, are among the parameters which one would likely adjust in order to effect the indicated transformations optimally. It is not desired to provide herein an exhaustive description of all possible conditions which are permitted in performing the above-described transformations since variation and optimization of such parameters is considered well within the purview of the skilled practitioner. However, it is generally found that the reaction temperature is noncritical and is conveniently in the range −80° to 100° C. Suitable molar ratios of catalyst to substrate are 1:10 to 1:100,000, and preferably are about 1:20 to 1:100. An aprotic solvent can be used, however, a reaction can also be conveniently performed neat. A reaction is preferably performed under low light conditions, such as in an opaque vessel, in order to prevent decomposition of formed compounds. Preferably, a reaction is conducted under inert atmosphere conditions in order to prevent decomposition of reactants and products. Other considerations regarding suitable reaction conditions are described in the examples presented hereinafter and are apparent to the skilled technician.

In an above-described method for coupling tin-containing precursors via one or more Sn—Sn bonds, a chemical coupling (polymerization) agent is employed. The coupling agent is said to be "suitable" for use with an instant method when it can effect any of the transformations illustrated by equations (1)—(3) above, their variants, and obvious analogs. Most notably, a "suitable" coupling agent is effective in linking two or more tin-containing moieties via a Sn—Sn bond. The coupling agent employed can be the active catalyst which actually performs the coupling step, or the coupling agent can be a precursor to the catalyst which is transformed under the reaction conditions to produce the active catalyst, either of which agents are said to be "suitable." Representative "suitable" coupling agents are presented in the examples hereinafter.

It is preferred that a suitable coupling agent of an instant method includes an electropositive metal, such as one selected from the early transition series, Group 2, Group 13, lanthanides, or actinides. In this regard, metals such as Sc, Y, Mg, Ca, Sr, Ba, Al, Ga, and the like, are preferred. Particularly preferred metals include early transition metals, especially Ti, Zr, and Hf. It is believed that the electrophilic properties of the electropositive metals are responsible for their efficacy as coupling agents.

It is also preferred that a suitable coupling (polymerization) agent is a metallocene, i.e., a metal sandwich compound, of an electropositive metal. In this regard, it is found that most metallocene derivatives studied to date are active catalysts or catalyst precursors. Particularly preferred metallocenes are zirconocene, hafnocene, or titanocene derivatives. Preferred ligand sets for these metallocenes include two π-bonded ligands which each contain an anionic 5-member ring, such as a cyclopentadienyl, indenyl, tetrahydroindenyl, or fluorenyl ligand, and the like.

Some preferred metallocene coupling agents are represented by the following formulas:

| CpCp'MX'X" | CpCp'MX+ |
| (Cp-A-Cp')MX'X" | (Cp-A-Cp')MX+ |
| CpCp'MZ | (Cp-A-Cp')MZ |

In the above formulas, M represents a Group 4 metal center, and X' and X" represent monovalent radicals, such as H, Cl, methyl, neopentyl, phenyl, trialkylsilyl, such as trimethylsilyl and triphenylsilyl, trimethylsilylmethyl, and tris(trimethylsilyl)silyl. In the formulas, Z represents a metallocycle, such as a zirconacycle, in which X' and X" are linked, such as with a $C_3H_6$ or $C_4H_8$ ligand. In the formulas, Cp and Cp' represent un-, mono-, di-, tri-, tetra-, or penta-substituted cyclopentadienyl groups. When A is present, as in a Cp—A—Cp' chelating ligand, A represents the linking group joining the cyclopentadienyl groups, such as a methylene, ethylene, or dimethylsilylene moiety.

When a substituent is present on such a cyclopentadienyl group, it is preferably selected from $C_1$–$C_{10}$ hydrocarbyl groups, such as methyl, ethyl, propyl, butyl, cyclohexyl, methylcyclohexyl, tolyl, benzyl, phenyl, methylphenyl, trifluoromethyl, and the like, trialkylsilyl, such as trimethylsilyl, trialkylgermyl, such as trimethylgermyl, trialkylstannyl, and trialkylplumbyl, as well as heteroatom-substituted hydrocarbyl groups, such as trimethylsilylmethyl, alkoxy, amido, phosphido, mercapto, and the like. A preferred monosubstituted ligand is methylcyclopentadienyl and a preferred pentasubstituted ligand is pentamethyl-cyclopentadienyl. Some examples of disubstituted cyclopentadienyl ligands, in which the two substituents are linked together, are $C_4H_4$ and $C_4H_8$ groups, as in indenyl or tetrahydroindenyl groups.

An example of a particularly preferred coupling agent (catalyst or catalyst precursor) is $(C_5H_5)_2ZrCl_2$. It is believed that the active coupling agent of this compound is $(C_5H_5)_2ZrCl(H)$ (Schwarz' catalyst) or $(C_5H_5)_2ZrH_2$.

An extensive list of zirconocene, hafnocene and titanocene derivatives, which can be employed with an instant method as coupling and/or polymerization agents, are described in U.S. Pat. No. 5,241,025, issued to Hlatky et al. (cols. 4–7) and U.S. Pat. No. 5,198,401 issued to Turner et al. (cols. 6–9), which disclosures are incorporated herein by reference. Other metallocene compounds that can be employed with the present invention are apparent to the skilled practitioner.

Without wishing to be limited to any particular reaction mechanism, it is likely that a four-center mechanism analogous to that proposed for coupling silane molecules (Tilley, 1993; Woo et al.) occurs in an instant method. In this mechanism, the metal center of the coupling agent has a formal $d^0$ electronic configuration. The bond between the metal and one of its ligands, e.g., hydride, is hypothesized to break concurrent with bond formation between the metal and a stannyl moiety.

The above proposed mechanism can be illustrated for the catalyst $(C_5H_5)(C_5Me_5)Zr[Si(SiMe_3)_3]Me$ (synthesized by the method of Elsner, et al., *J. Organomet. Chem.*, 358:169 (1988)), which catalyst is suitable for coupling dialkylhydrostannanes as described in Example 1 hereinbelow. The catalyst is believed to undergo an initial conversion (during an initial induction period) to a zirconium-stannyl species, such as $(C_5H_5)(C_5Me_5)Zr(Me)(^nBu_2SnH)$. The zirconium-stannyl species is believed to react with additional hydrostannane to form the zirconium hydride species (the likely catalyst) $(C_5H_5)(C_5Me_5)Zr(Me)(H)$, with concomitant loss of H"$Bu_2$Sn—Sn"$Bu_2$H. The zirconium hydride species can then react with the same or additional stannane compounds via a four-center intermediate to form a new zirconium-stannyl species with loss of dihydrogen. In this proposed reaction mechanism, the zirconium hydride species would be considered a catalyst since it is continually regenerated each time two stannyl groups are coupled, e.g., the stannyl group of a zirconium-stannyl species and the stannyl group of a reactive free stannane.

Novel compositions of matter are afforded by the present invention. The present invention permits the formation of high molecular mass compounds by coupling catenated tin oligomers and/or by polymerizing relatively small molecules (monomers). Such high polymers of tin are usually referred to herein as polystannanes.

The chemical formula for a polystannane of the invention can be represented in a number of ways, as long as the catenated nature of the compound is accurately reflected. Hence, one formula of a linear polystannane of the invention, which can be formed for instance by covalently linking multiple dialkylhydrostannane molecules, is X—$(R^1R^2Sn)_n$—Y. In the formula, X, Y, $R^1$ and $R^2$ are each hydrogen or a monovalent hydrocarbyl radical, as defined hereinabove, and generally, though not always, $R^1$ and $R^2$ are identical. Also, in the formula, "n" represents the repeat number for monomer units occurring along the backbone of the compound, and is commonly greater than about 5, frequently greater than 10, and often greater than about 70. The values of "n" obtained depend on the pairing of dialkylhydrostannane compound and polymerization catalyst and can be affected significantly by subtle steric interactions.

Due to the current unavailability of polymeric tin molecular weight reference standards, the molecular masses and degrees of polymerization reported herein are taken relative to polystyrene standards. To a first approximation, the degree of polymerization can be related to the measured "molecular weight" of a tin polymer described herein according to equation (4) below:

$$n = (\text{molecular weight})/104 \times 2 \times 0.77/1.4. \qquad (4)$$

In the equation, "molecular weight" is the polystyrene-referenced molecular weight (Mw or Mn) obtained from gel permeation chromatography (GPC), "104" is the mass of a styrene monomer, "2" indicates that two carbon atoms are in each repeat unit of polystyrene, and "0.77" and "1.4" are the covalent radii of carbon and tin, respectively [personal communication of Prof. John Harrod, Chemistry Department, McGill University, Montreal, Canada]. An assumption implicit in equation (4) is that the molecular weight obtained from GPC is predominately a function of polymer chain length and that the effect on "n" of differences in branching groups extending from the polymer backbone can be substantially ignored. Consequently, equation (4) does not reflect the effect that differences in branching groups may have on estimated "n" values. More accurate estimates of "n" must be deferred until reliable molecular weight standards become available for the instant molecules.

Another type of polystannane molecule contemplated within the present invention has the formula X—$(R^1R^2Sn)_n$—$(R^3R^4Sn)_m$—Y, wherein the sum of "n" and "m" signifies the chain length as described hereinabove, and X, Y, $R^1$, $R^2$, $R^3$, and $R^4$ are each hydrogen or a monovalent radical as previously defined. The present formula is used to indicate that two different tin oligomers or polymers can be dehydrocoupled to produce a longer molecule. Hence, $R^1$, $R^2$, $R^3$, and $R^4$ can be any substituent, but typically $R^1$, and/or $R^2$ will differ from $R^3$ and/or $R^4$. It should be stressed, however, that $R^1$, $R^2$, $R^3$, and $R^4$ can all be identical, as when direct coupling of separately prepared oligomers is preferred over polymerizing a single monomer.

Preferably, and typically, X and Y in the above formula are each hydrogen, as when a dialkylstannane is polymerized to form a polystannane. Preferred monovalent radicals referred to above include alkyl, aryl, alkaryl, aralkyl, silyl, siloxy, amido, alkoxy, amidosilyl, stannyl, and stannoxy radicals, and chimeric mixtures thereof. It should also be noted that each of X, Y, $R^1$, $R^2$, $R^3$, and $R^4$ of the above formula can be halogen, although this is not likely or preferred due to the electron-withdrawing effects of halogen.

Among particularly preferred monovalent hydrocarbyl radicals are monovalent alkyl and aryl radicals. In particular, those having one to twelve carbon atoms corresponding to $C_1$–$C_{12}$ groups, including methyl to dodecyl, cyclohexyl, and aromatic groups such as phenyl, or tolyl are preferred. Such groups can also contain one or more heteroatoms, e.g., O, N, S, P, Si, Sn, and the like.

Since formation of tin polymers by direct dehydropolymerization of stannane monomers, as described herein, occurs by chain growth, a plurality of polystannanes having differing chain lengths is typically produced. Hence, a typical composition of the invention comprises a plurality of nonidentical polystannanes each having a formula as shown above. Moreover, since cyclization reactions can also occur by the dehydrocoupling reactions described above, some degree of cyclic product is expected, and is usually present, in compositions containing linear products having the formula indicated hereinabove.

An exemplary polystannane of the invention occurs when $R^1$ and $R^2$ in equation (3) above are n-butyl, and the plurality of polystannanes formed as described in Example 1 hereinbelow has a $\lambda_{max}$ greater than or equal to about 370 nm. Values for "n" in the polystannanes, as estimated from polystyrene standards in GPC, range from 5 to several hundred depending on the polymerization catalyst.

A further exemplary composition comprising a plurality of polystannanes is formed by the dehydropolymerization of diphenylstannane, as described in Example 3 hereinbelow. The value for $\lambda_{max}$ in this composition is greater than or equal to about 400 nm and the value for "n" in the formula of equation (3) is estimated (from equation (4)) to be in the range from 3 to 12.

Although a method of the invention is capable of producing polystannanes having quite long chains, a number of factors affect chain length in a growing polymer molecule. Consequently, the degree of polymerization (repeat number n) of a compound is almost always less than about 1,000,000, and frequently is less than about 100,000. A tin polymer of the invention can also have "n" less than about 10,000 to 20,000. Depending on the particular substituents of the polystannane and the catalyst used to form it, "n" can also be less than about 1000.

In terms of molecular mass, a polystannane of the present invention can have any mass consistent with its degree of polymerization, i.e., the mass reflects the mass of individual monomer units. Typically, the number average molecular weight (Mn) of an instant polystannane composition is greater than about 2 kilodaltons, even when cyclic compounds are included. A composition of linear polystannane molecules can have Mn greater than about 15 kilodaltons, such as when di-n-butylstannane is polymerized. As used herein the number average molecular weight (Mn) of a mixture of polystannane molecules is with reference to polystyrene standards (Woo et al.).

A polymer composition of the present invention is often characterized herein in terms of the ratio (Mw/Mn), called its polydispersity or heterogeneity, where Mn is the number average molecular weight and Mw is the average molecular weight. For example, when Mw is 100,000 amu and Mn is 20,000 amu, the polydispersity of the composition is 5, which indicates that the composition is comprised largely of long chain molecules. When Mw and Mn of a composition are equal, the polydispersity is 1, which indicates that the polymer lengths have a Gaussian distribution. A polystannane composition of the present invention frequently has a polydispersity greater than about 3.

Also contemplated within the present invention is a method for decomposing a polystannane molecule of the invention on a substrate. The method can find use in such applications as photoresist technologies, where a radiation source is used to decompose a substance at a particular site on the surface of a semiconductor.

An instant decomposition method comprises contacting the substrate with a polystannane, as described hereinabove, and exposing the polystannane on the substrate to a radiation source. Under irradiation conditions effective to decompose the polystannane, products smaller than the original polystannane molecule are formed, such as oligostannanes. Generally, the decomposition process is conducted until absorption of incident radiation substantially ceases, i.e., the polystannane is converted into substantially nonabsorptive species.

Because of the convenience of synthesizing a plurality of polystannanes by a dehydropolymerization method described above, it is generally preferred to apply a composition containing a plurality of nonidentical compounds to a substrate, without previously separating the mixture into its component polymers. Preferably, a polystannane composition for use in such decomposition process contains polystannanes having a degree of polymerization greater than about 10–20, in order to assure that the compound is absorptive to relatively low energy radiation and, in some cases, to assist in providing a vapor pressure differential between the polymer and its decomposition products. A polystannane useful for such decomposition process has a molecular weight greater than about 15 kilodaltons and a correspondingly low vapor pressure.

The radiation source for use in a decomposition process described above is any source effective to decompose the polystannane within the parameters appropriate for the desired application. Typical radiation sources include ultraviolet light, visible light (including fluorescent room light), as well as electrons, such as are present in an electron beam, and ions, such as in an ion beam. Whenever a mask is employed to restrict irradiation of the substrate's surface to a precisely defined area, the contrast enhancement properties of a polystannane on the substrate are also important.

The following examples are presented solely in order to illustrate certain aspects of the invention and do not in any way limit the scope of the invention.

EXAMPLES

In the examples below, various zirconocene and hafnocene derivatives were prepared according to published literature procedures. $(C_5H_5)_2ZrCl_2$ was purchased from Aldrich Chemical Co. (Milwaukee, Wis.) or Strem Chemical Co. (Waltham, Mass.). $(C_5H_5)_2ZrMe_2$, $(C_5H_5)_2HfMe_2$, and $(C_{5I\,H5})(C_5Me_5)ZrMe_2$ were prepared in a two-step process from the tetrachlorides according to Samuel et al., *J. Organometallic Chem.*, 4:152 (1965) and Samuel et al., *JACS*, 95:6263 (1973). $(C_5Me_5)$ was prepared according to Manriquez et al., *JACS*, 100:2716 (1978). $(C_5H_5)(C_5Me_5)Zr[Si(SiMe_3)_3]Me$ and $(C_5H_5)(C_5Me_5)Zr[Si(SiMe_3)_3]Cl$ were synthesized according to Elsner at al., *J. Organomtallic Chem.*, 358:169 (1988), and $(C_5H_5)(C_5Me_5)Hf[Si(SiMe_3)_3]Cl$ was prepared similarly. $(C_5H_5)_2Zr[Si(SiMe_3)_3]Me$ was synthesized according to Campion et al., *JACS*, 109:2049 (1987).

Hydrostannane monomers and $Bu_2GeH_2$ were prepared routinely by $LiAlH_4$ reduction of the corresponding dichloride, which was purchased commercially from a variety of sources. Purity of the monomers was confirmed by $^1H$ NMR spectroscopy. $^{119}Sn$ spectra were obtained on a General Electric QE-300 spectrometer. Absorption spectra and photobleaching studies were performed on an IBM 9420 UV-Vis spectrophotometer. Emission spectra were obtained by Dr. M. Sailor, Department of Chemistry, University of California, San Diego.

Example 1

Polymerization of $^nBu_2SnH_2$ with $(C_5H_5)(C_5Me_5)Zr[Si(SiMe_3)_3]Me$

Addition of neat $^nBu_2SnH_2$ (0.30 g) to the catalyst $(C_5H_5)(C_5Me_5)Zr[Si(SiMe_3)_3]Me$ (2 mol %) resulted in vigorous hydrogen evolution and a dark red mixture when protected from room light. Hydrogen evolution slowed after a few minutes, but continued over the next 5 hours, during which time the reaction mixture solidified. The solid was dissolved in 20 mL dry pentane, to which dry methanol (20 mL) was added to separate the polymer as a yellow oil. Removal of solvent by decantation, followed by drying under vacuum resulted in 93% yield of polystannanes as a yellow solid.

Molecular mass analysis of the polystannane material by gel permeation chromatography (GPC; polystyrene standards) revealed (FIG. 1A) a sharp peak at about 1000 amu (29%), which is assigned to cyclic $(Sn^nBu_2)_n$ species of as yet undetermined ring size. The predominant, higher molecular mass fraction (Mw/Mn=17,500/7800) is attributed to $H(Sn^nBu_2)_nH$ chains, which may have some degree of branching. A rough estimate for the average degree of polymerization for these chains, made by accounting for the difference in mass between styrene and $^nBu_2Sn$ monomer units, is approximately 185 (80 when the cyclic product is included) (Tilley 1993).

As is also seen for the dehydropolymerization of silanes, a much higher yield of the lighter cyclic species is obtained under more dilute conditions. Thus, reaction of $^nBu_2SnH_2$ (0.30 g) in the presence of $(C_5H_5)(C_5Me_5)Zr[Si(SiMe_3)_3]Me$ (2 mol %) in toluene (1 mL) for 10 hour at room temperature gave principally the cyclic material.

Whereas the $^1H$ and $^{13}C$ NMR spectra for this polymeric product are relatively uninformative, the cyclic and linear species are well-resolved in $^{119}Sn$ $\{^1H\}$ spectra. Based on correlations between peak intensities in GPC traces and $^{119}Sn$ $\{^1H\}$ NMR spectra (111.9 MHz, $C_6D_6$), it is possible to assign a peak at $\delta$ −189.6 ppm to the $^{119}Sn$ resonance of linear polymer species, and a peak at $\delta$ −200.9 ppm to the cyclic polystannane(s). $^nBu_2Sn$—H end groups have not been detected in $^1H$ or $^{119}Sn$ NMR spectra, but this is to be expected given the high molecular masses. The above chemical shift assigments differ from those reported (by Zou et al.) for $(Sn^nBu_2)_n$ species obtained by a Wurtz-type coupling method. However, the present data are more consistent with what has been reported earlier for $(Sn^nBu_2)_n$ oligomers (n=3–5) (Jousseaume et al.).

Without wishing to be limited to any particular mechanism, it is believed that the reaction described here proceeds in a manner mechanistically similar to that proposed for hydrosilane polymerization (Tilley, 1993). In this proposed mechanism, the reaction is believed to occur via concerted, four-center transition states that make and break δ bonds as described hereinabove.

Example 2.

Dependence of $^nBu_2SnH_2$ polymerization on metallocene catalyst

The effects of different metallocene catalysts on polymer length and the relative production of linear and cyclic compounds were examined. The reactions were conducted typically for 24 hours under neat conditions as described above in Example 1. Typical Mw/Mn values for the polymer product (polystannanes) are presented in Table 1 hereinbelow, with the values shown both including and excluding the cyclic species.

As shown in Table 1, $(C_5H_5)(C_5Me_5)ZrMe_2$ was the most effective metallocene in producing long-chain $H(^nBu_2Sn)_nH$ polymers under these reaction conditions.

TABLE 1

| Catalyst** | Linear only Mw/Mn | with Cyclic Mw/Mn | n (est'd) # |
|---|---|---|---|
| $Cp_2ZrCl_2$ | 38,800/15,300 | 31,000/4200 | 410 |
| $Cp_2ZrMe_2$ | 22,400/7900 | 17,600/2700 | 240 |
| $Cp_2Zr[Si(SiMe_3)_3]Me$ | 22,100/6300 | 17,800/2000 | 230 |
| $CpCp*ZrMe_2$ | 92,900/12,400 | 69,100/2600 | 980 |
| $CpCp*Zr[Si(SiMe_3)_3]Cl$ | — | 7300/2000 | — |
| $CpCp*Zr[Si(SiMe_3)_3]Me$ | 17,500/7840 | 12,700/2700 | 185 |
| $Cp*_2ZrMe_2$ | — | 1000/800 | — |
| $Cp_2HfMe_2$ | — | 2000/1600 | — |
| $CpCp*Hf[Si(SiMe_3)_3]Cl$ | — | 5200/1200 | — |

**catalyst conc. = 2 mol %; reaction time = 1 hour to 2 days; Cp = $C_5H_5$, Cp* = $C_5Me_5$; #n (est'd) = Mw/104 × 2 × 0.77/1.4 for linear only product.

Example 3.

Reaction of $(C_6H_5)_2SnH_2$ and $(C_5H_5)(C_5Me_5)Zr[Si(SiMe_3)_3]Me$

Addition of neat $(C_6H_5)_2SnH_2$ (0.30 g) to $(C_5H_5)(C_5Me_5)Zr[Si(SiMe_3)_5]Me$ (2 mol %), resulted in vigorous hydrogen evolution and a yellow-brown mixture, which was protected from room light. The mixture was frozen after five hours. The resulting polymer mixture was washed with dry tetrahydrofuran-pentane to give a yellow solid. Molecular weight analysis of the product by gel permeation chromatography revealed that Mw/Mn was 1380/620 (linear fraction was 1530/1050. $\lambda_{max}$ for this product was 398 nm.

Example 4

Reaction of $^nBu_2SnH_2$ and $(C_5H_5)_2ZrCl_2$.

Addition of neat $^nBu_2SnH_2$ (0.30 g) to $(C_5H_5)_2ZrCl_2$ (2 mol %) resulted in hydrogen evolution and a dark red mixture, which was protected from room light. The mixture solidified after about thirty minutes and the resulting polymer was washed with hexane giving a light yellow solid after filtration. Analysis of the polymer by GPC revealed Mw/Mn was 31,000/4200 (linear fraction was 38,800/15, 300). The UV and NMR spectra of the product were virtually identical to those for the $^nBu_2Sn$ polymer prepared in Example 1.

Example 5

Reaction of Various Stannanes with $(C_5H_5)_2$

The coupling efficiencies of various hydrostannane monomers were studied using a single metallocene catalyst: $(C_5H_5)_2ZrMe_2$ (2 mol %). The reactions were conducted as described in Example 1 and the results are presented in Table 2 hereinbelow. The amount of cyclic product formed in each reaction ranged from 0 to 100 wt % depending on experimental conditions, with more dilute conditions favoring cyclic species.

TABLE 2

| Monomer | Linear only Mw/Mn | with Cyclic Mw/Mn | n (est'd)* |
|---|---|---|---|
| $^nBu_2SnH_2$ | 57,860/16,950 | 49,430/5720 | 610 |
| $^tBu_2SnH_2$ | dimer only | | 2 |
| $^nOct_2SnH_2$ | 92,600/21,700 | 82,800/9100 | 980 |
| $Ph_2SnH_2$ | — | 1480/330 | — |
| $PhMeSnH_2$ | — | 1810/780 | — |

*n (est'd) is as defined in Table 1.

Figure 1B:
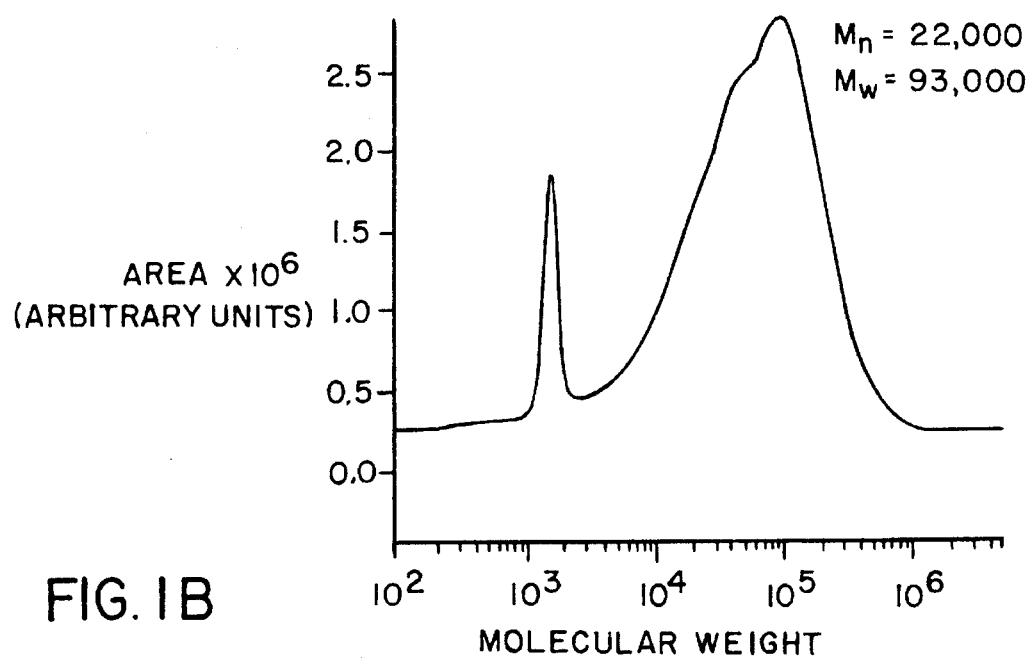
FIG. 1B depicts a gel permeation chromatogram of the polymerization products of $^nOct_2SnH_2$, formed as described in Example 5. The catalyst used in this study was $(C_5H_5)_2ZrMe_2$.

The above results suggest that dialkylstannanes are more efficiently coupled than diarylstannanes, probably due to steric hindrance or delocalization of electronic charge on the aromatic rings. The formation of dimers from the $^tBu_2SnH_2$ monomer is probably due to steric hindrance by the $^tBu$ groups. A GPC of the $^nOct_2SnH_2$ product is shown in FIG. 1B.

Example 6

Reaction of Various Monomers with $(C_5H_5)(C_5Me_5)Zr[Si(SiMe_3)_3]Me$

The polymerization of various monomers in the presence of $(C_5H_5)(C_5Me_5)Zr[Si(SiMe_3)_3]Me$, as described in Example 1 hereinabove, was studied. The results are presented in Table 3 hereinbelow and show that the catalyst is effective in polymerizing a wide variety of disubstituted hydrostannanes. When Me2SnH= was used as the monomer, no cyclic product was observed. When a dialkylgermane monomer ($Bu_2GeH_2$) was used, only cyclic product was observed.

TABLE 3

| Monomer | Linear only Mw/Mn | with Cyclic Mw/Mn | n (est'd)* |
|---|---|---|---|
| $Me_2SnH_2$ | 3600/590 | — | 38 |
| $^nBu_2SnH_2$ | 17,500/7840 | 12,700/2700 | 185 |
| $^tBu_2SnH_2$ | dimer only | | 2 |
| $^nOct_2SnH_2$ | 95,700/14,300 | 84,800/6800 | 1010 |
| $Ph_2SnH_2$ | 1530/1050 | 1380/620 | 16 |
| $PhMeSnH_2$ | 1700/920 | 1550/700 | 18 |
| $Bu_2GeH_2$ | — | 990/950 | — |

*n (est'd) is as defined in Table 1.

Example 7

Two-step polymerizations of $^nBu_2SnH_2$

Figure 2:
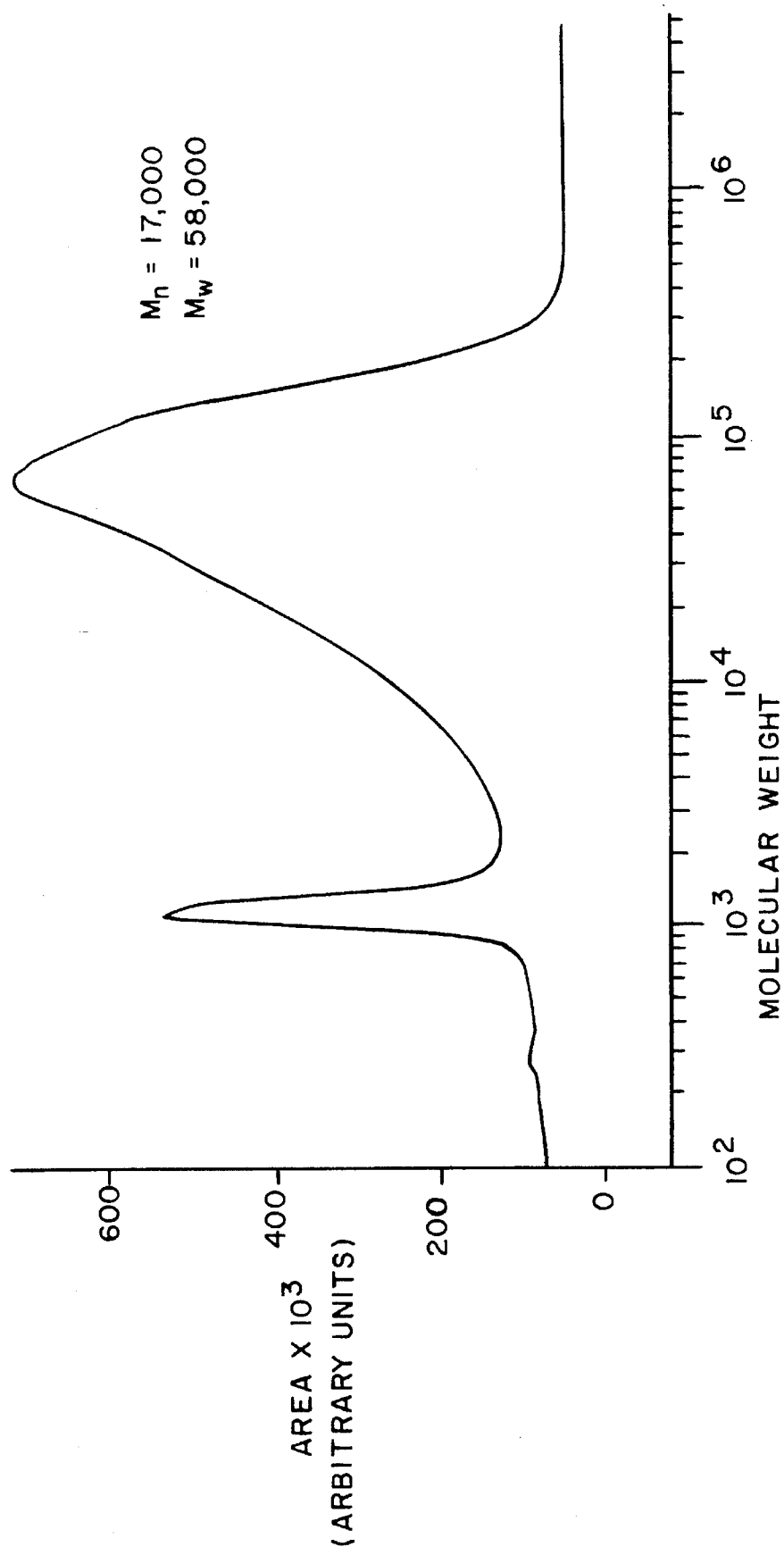
FIG. 2 depicts a gel permeation chromatogram for the polystannane product formed by a two-step polymerization process involving the coupling of oligomers of $H-(^nBu_2Sn)_n-H$, where n=2–6, as described in Example 7.

Polymers having the formula $H—(^nBu_2Sn)_n—H$ were synthesized from $^nBu_2SnH_2$ monomers via a two-step process whereby oligomers of the monomers were first synthesized in the presence of a dehydropolymerization catalyst and the oligomers were then coupled using the same or different catalyst. Catalyst concentrations for the first and second steps of the polymerization were 1 mol % and 2 mol %, respectively. Reaction times were dependent on catalyst activity but ranged from a few hours to two days. The results of these studies are presented in Table 4. The molecular weight profile obtained by GPC of the product made using the $Cp*_2ZrMe_2/Cp_2ZrMe_2$ catalyst pair is shown in FIG. 2.

TABLE 4

| Catalyst** | Linear only Mw/Mn | with Cyclic Mw/Mn | n (est'd) # |
|---|---|---|---|
| 1: $Cp*_2ZrMe_2$ | — | 320/315 | — |
| 2: $CpCp*ZrMe_2$ | 56,400/13,000 | 41,660/3050 | 600 |
| 1: $Cp*_2ZrMe_2$ | — | 380/240 | — |
| 2: $Cp_2ZrMe_2$ | 35,540/12,700 | 31,300/5360 | 380 |
| 1: $Cp*_2ZrMe_2$ | — | 380/240 | — |
| 2: $CpCp*Zr[Si(SiMe_3)_3]Me$ | 12,100/7820 | 6890/1440 | 130 |
| 1: $CpCp*HfMe_2$ | — | 2000/1600 | — |
| 2: $Cp_2ZrMe_2$ | 59,400/14,400 | 51,600/5600 | 630 |

**$Cp = C_5H_5$; $Cp* = C_5Me_5$; steps 1 and 2 are indicated by "1" and "2" respectively. #n (est'd) as defined in Table 1.

Example 8

Absorption spectra of polystannanes

Figure 3:
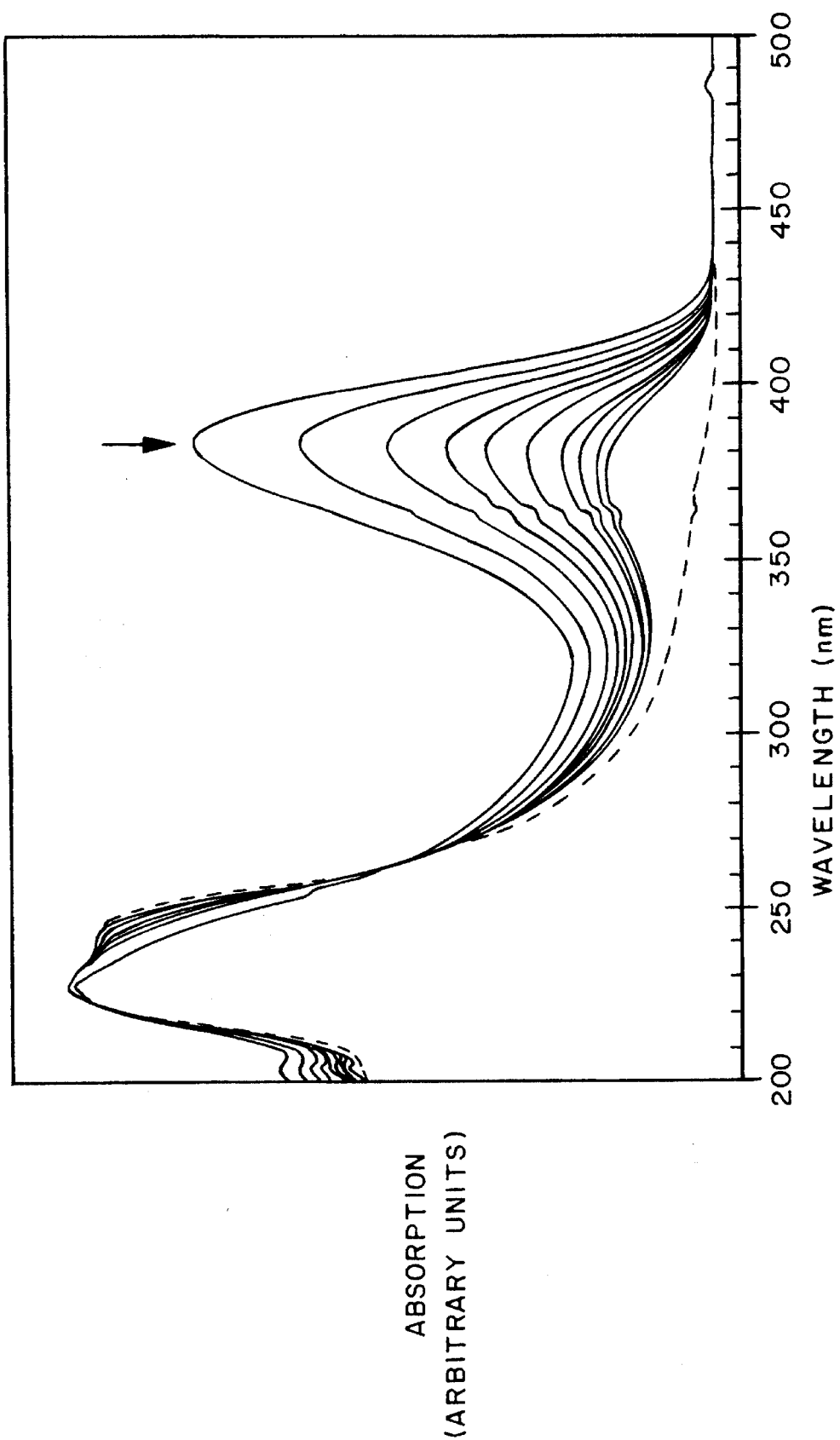
FIG. 3 depicts the photobleaching behavior of a $H(Sn^nBu_2)_nH$ sample (Mw/Mn=17,600/7800; $\lambda_{max}$=384 nm) in pentane solution upon irradiation by room light, as described in Example 9. Measurements were taken every 30 seconds; the final spectrum is indicated by the dotted line.

High molecular mass values for the polystannanes described above are also supported by electronic absorption spectra. For a $H(Sn^nBu_2)_nH$ sample with Mw/Mn=17,600/7800 (GPC), the $\lambda_{max}$ value is 384 nm (FIG. 3). For comparison, the $\lambda_{max}$ value for $Et(SnEt_2)_6Et$ is 325 nm (Creemers et al.) and the $\lambda_{max}$ value for the purported $(Sn^nBu_2)_n$ material of Zou et al. is 365 nm. It has been established that $\lambda_{max}$ values increase with molecular mass, up to a limiting value, for polysilanes, polygermanes (Trefonas et al.; Miller et al.), and polystannanes (Sita; Adams et al.). In addition, the $(Si^nBu_2)_n$ polysilanes and $(Ge^nBu_2)_1$ polygermanes have limiting $\lambda_{max}$ values of 314 and 333 nm, respectively. Thus, the polystannanes described herein appear to possess relatively long, δ-conjugated chromophores.

The $\lambda_{max}$ values for a number of polystannanes prepared substantially by the method described in Example 1 are presented in Table 5 hereinbelow.

TABLE 5

| Polystannane | Linear only Mw/Mn | with Cyclic Mw/Mn | λmax* | n (est'd)** |
|---|---|---|---|---|
| $H(^nBu_2Sn)_nH$ | 22,400/7900 | 17,600/2700 | 384 | 240 |
| $H(^tBu_2Sn)_nH$ | dimer only | — | — | 2 |
| $H(^nOct_2Sn)_nH$ | 92,600/21,700 | 82,800/9100 | 384 | 980 |
| $H(Ph_2Sn)_nH$ | — | 1,480/330 | 402 | — |
| $H(PhMeSn)_nH$ | — | 1,810/780 | 378 | — |

*all spectra were obtained in pentane except for $H(Ph_2Sn)_nH$, which was obtained in tetrahydrofuran;
**n (est'd) is as defined in Table 1.

Example 9

Decomposition on a substrate

The polystannanes prepared above are photosensitive, and photodegradation occurs upon exposure of the polymers to fluorescent room light. Such photobleaching behavior has been previously reported for polysilanes and polygermanes, and is of particular interest with respect to photoresist technology (Miller et al.).

The photobleaching properties of the instant compounds were typically confirmed by placing a solution of a polystannane to be studied in a quartz cuvette, removing solvent from the cuvette under vacuum, and placing the cuvette in a spectrophotometer. The solvent removal step left a film of polystannane coated on the interior surface of the cuvette. The film in the cuvette was then exposed to the ultraviolet or visible light source of the spectrophotometer and the photoinduced decomposition was monitored every 30 seconds. The results of photobleaching $H—(^nBu_2Sn)_n—H$ (Mw/Mn=17,600/7800) are shown in FIG. 3. The disappearance of the band at 384 nm is indicative of polystannanes being converted to smaller molecules.

Example 10

Conductivity measurements

A sample of a $H(^nBu_2Sn)_2H$ polymer product (Mw/Mn= 58,000/17,000) prepared as in Example 5 was dissolved in pentane and a portion of the solution was evaporated to a film under inert atmosphere. The film was exposed to $SbF_5$ dopant under vacuum. A standard four-point probe method was used to measure the conductivity of the doped film, which was determined to be $10^{-2}$ $ohm^{-1}cm^{-1}$. A film of $H(^nOct_2Sn)_2H$ polymer (Mw/Mn=42,500/13,300) was similarly doped with $SbF_5$ and its conductivity was determined to be 0.3 $ohm^{-1}cm^{-1}$.

Example 11

Emission Spectra of polystannanes

Although no emission (337.1 nm excitation; $N_2$ laser) was observed for cyclic $(Sn^nBu_2)_n$ oligomer, the higher molecular mass chains gave rise to an emission band centered at 505 nm ($H—(^nBU_2Sn)_n—H$ (Mn=7800); solid state). By comparison, high molecular mass polysilanes are known to exhibit 20–30 nm Stokes-shifted emissions (Miller et al.).

DISCUSSION OF RESULTS

The results described above demonstrate that: i) high molecular mass polystannanes can be synthesized by a convenient and direct method; ii) the above-described dehydropolymerization reactions can provide tin polymers not otherwise readily obtained; and iii) the optical properties of the polystannanes make them potentially useful commercially.

Although the present invention has been described in some detail by way of formula and example, it should be appreciated that the scope of the invention is not limited by such formulas and examples, and that certain obvious modifications of the above description and the appended claims can be practiced within the scope of the invention.

What is claimed is:

1. A method for making a tin compound having at least one tin-tin bond comprising:

combining first and second reactants each containing a tin-hydrogen bond; and dehydrogenating said reactants in the presence of a tin coupling agent to form hydrogen gas and combine said reactants to form said tin compound having said tin-tin bond.

2. A method as in claim 1, wherein said first and second reactants are identical.

3. A method as in claim 1, wherein at least one of said first and second reactants further contains a tin-tin bond.

4. A method as in claim 1, wherein said first and second reactants are selected from the group consisting of mono-, di-, and tri-organo-substituted hydrostannanes.

5. A method as in claim 4, wherein each substituent of said mono-, di-, and tri-organo-substituted hydrostannanes is selected from the group consisting of alkyl, aryl, alkaryl, aralkyl, silyl, siloxy, amido, alkoxy, amidosilyl, stannyl, and stannoxy, and mixtures thereof.

6. A method as in claim 1, wherein said first and second reactants are selected from the group consisting of dialkyl-hydrostannanes, diaryl-hydrostannanes and alkyl-aryl-hydrostannanes.

7. A method as in claim 1, wherein said tin compound is substantially linear.

8. A method as in claim 1, wherein said first and second reactants do not contain halogen.

9. A method as in claim 1, wherein said coupling agent comprises an electropositive metal.

10. A method as in claim 1, wherein said coupling agent comprises a transition, lanthanide or actinide metal.

11. A method as in claim 1, wherein said coupling agent is a metallocene.

12. A method of forming a tin compound having at least one tin-tin bond comprising reacting a first hydrostannane molecule with a second hydrostannane molecule in the presence of a metal catalyst to dehydrogenate the hydrostannane molecules and link a tin atom of the first hydrostannane molecule to a tin atom of the second hydrostannane molecule.

13. A method as in claim 12, wherein said first and second hydrostannane molecules are identical.

14. A method as in claim 12, wherein at least one of said first and second hydrostannane molecules has a tin-tin bond.

15. A method as in claim 12, wherein each of said first and second hydrostannane molecules are selected from the group consisting of mono-, di-, and tri-organo-substituted hydrostannanes.

16. A method as in claim 15, wherein each substituent of said mono-, di-, and tri-organo-substituted hydrostannanes is selected from the group consisting of alkyl, aryl, alkaryl, aralkyl, silyl, siloxy, amido, alkoxy, amidosilyl, stannyl, and stannoxy, and mixtures thereof.

17. A method as in claim 12, wherein said first and second hydrostannane molecules are selected from the group consisting of dialkyl-hydrostannanes, diaryl-hydrostannanes and alkyl-aryl-hydrostannanes.

18. A method as in claim 12, wherein said first and second hydrostannane molecules do not contain halogen.

19. A method as in claim 12, wherein said coupling agent comprises an electropositive metal.

20. A method as in claim 12, wherein said coupling agent comprises a transition, lanthanide, or actinide metal.

21. A method as in claim 12, wherein said coupling agent is a metallocene.

22. A process for polymerizing a plurality of hydrostannane molecules each containing a tin-hydrogen bond, comprising:

incorporating a metal catalyst with the hydrostannane molecules to form an admixture thereof; and reacting the hydrostannane molecules in the presence of the catalyst to dehydrogenate the hydrostannane molecules and combine said plurality of hydrostannane molecules into at least one polymeric stannane.

23. A process as in claim 22, further comprising isolating said at least one polymeric stannane from unreacted reactants, the catalyst or reaction byproducts.

24. A process as in claim 22, wherein said hydrostannane molecules are selected from the group consisting of mono-, di-, and tri-organo-substituted hydrostannanes.

25. A process as in claim 24, wherein each substituent of said mono-, di-, and tri-organo-substituted hydrostannanes is selected from the group consisting of alkyl, aryl, alkaryl, aralkyl, silyl, siloxy, amido, alkoxy, amidosilyl, stannyl, and stannoxy, and mixtures thereof.

26. A process as in claim 22, wherein said hydrostannane molecules are selected from the group consisting of dialkylhydro-stannanes, diaryl-hydrostannanes, and alkyl-arylhydrostannanes.

27. A process as in claim 22, wherein said hydrostannane molecules contain at least one tin-tin bond.

28. A process as in claim 22, wherein said at least one polymeric stannane is substantially linear.

29. A process as in claim 22, wherein said at least one polymeric stannane has a degree of polymerization greater than about 10.

30. A process as in claim 22, wherein a plurality of nonidentical polymeric stannane compounds are formed.

31. A process as in claim 22, wherein said coupling agent comprises an electropositive metal.

32. A process as in claim 22, wherein said coupling agent comprises a transition, lanthanide or actinide metal.

33. A process as in claim 22, wherein said coupling agent is a metallocene.

* * * * *